(12) United States Patent
Churchill et al.

(10) Patent No.: US 11,907,414 B2
(45) Date of Patent: Feb. 20, 2024

(54) OBJECT TRACKING ANIMATED FIGURE SYSTEMS AND METHODS

(71) Applicant: Universal City Studios LLC, Universal City, FL (US)

(72) Inventors: David Michael Churchill, Orlando, CA (US); Clarisse Vamos, Orlando, CA (US); Jeffrey A. Bardt, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 17/828,932

(22) Filed: May 31, 2022

(65) Prior Publication Data

US 2022/0292754 A1    Sep. 15, 2022

Related U.S. Application Data

(63) Continuation of application No. 16/862,158, filed on Apr. 29, 2020, now Pat. No. 11,354,842, which is a
(Continued)

(51) Int. Cl.
*G06F 3/01* (2006.01)
*G06T 13/40* (2011.01)
(Continued)

(52) U.S. Cl.
CPC ............... *G06F 3/011* (2013.01); *G06T 7/20* (2013.01); *G06T 13/40* (2013.01); *G06V 10/60* (2022.01);
(Continued)

(58) Field of Classification Search
CPC ....... G06K 9/00536; G06T 13/40; G06T 7/20; G06V 40/10; G06F 3/011; G06F 3/0484
See application file for complete search history.

(56) References Cited

U.S. PATENT DOCUMENTS

| | | |
|---|---|---|
| 6,070,269 A | 6/2000 | Tardif et al. |
| 6,428,222 B1 | 8/2002 | Dunham |

(Continued)

FOREIGN PATENT DOCUMENTS

| | | |
|---|---|---|
| JP | 2012111038 A | 6/2012 |
| JP | 201402190 A | 3/2014 |

(Continued)

OTHER PUBLICATIONS

PCT/US2019/066068 International Search Report and Written Opinion dated Mar. 20, 2020, 17 pages.
(Continued)

*Primary Examiner* — Xilin Guo
(74) *Attorney, Agent, or Firm* — Fletcher Yoder P.C.

(57) ABSTRACT

An animation system includes an animated figure, multiple sensors, and an animation controller that includes a processor and a memory. The memory stores instructions executable by the processor. The instructions cause the animation controller to receive guest detection data from the multiple sensors, receive shiny object detection data from the multiple sensors, determine an animation sequence of the animated figure based on the guest detection data and shiny object detection data, and transmit a control signal indicative of the animation sequence to cause the animated figure to execute the animation sequence. The guest detection data is indicative of a presence of a guest near the animated figure. The animation sequence is responsive to a shiny object detected on or near the guest based on the guest detection data and the shiny object detection data.

20 Claims, 4 Drawing Sheets

Related U.S. Application Data continuation of application No. 16/269,471, filed on Feb. 6, 2019, now Pat. No. 10,679,397.

(60) Provisional application No. 62/779,373, filed on Dec. 13, 2018.

(51) Int. Cl.
*G06T 7/20* (2017.01)
*G06V 40/10* (2022.01)
*G06V 10/60* (2022.01)
*G06V 40/16* (2022.01)

(52) U.S. Cl.
CPC ............ *G06V 40/10* (2022.01); *G06V 40/103* (2022.01); *G06V 40/161* (2022.01); *G06V 40/164* (2022.01); *G06F 2218/12* (2023.01)

(56) References Cited

U.S. PATENT DOCUMENTS

| | | | |
|---|---|---|---|
| 2009/0226079 A1* | 9/2009 | Katz | G06T 7/507 |
| | | | 382/154 |
| 2010/0290032 A1 | 11/2010 | Bugge | |
| 2011/0306396 A1 | 12/2011 | Flury et al. | |
| 2013/0069804 A1 | 3/2013 | Han et al. | |
| 2013/0073087 A1* | 3/2013 | Irmler | B25J 11/0015 |
| | | | 901/47 |
| 2013/0226588 A1* | 8/2013 | Irmler | A63H 30/00 |
| | | | 704/E21.001 |
| 2013/0235045 A1 | 9/2013 | Corazza et al. | |
| 2013/0278635 A1 | 10/2013 | Maggiore | |
| 2014/0003034 A1* | 1/2014 | Lien | G09F 13/04 |
| | | | 362/249.05 |
| 2015/0336013 A1 | 11/2015 | Stenzler et al. | |
| 2018/0104614 A1 | 4/2018 | Gutierrez et al. | |
| 2018/0147728 A1 | 5/2018 | Vyas et al. | |
| 2019/0043281 A1 | 2/2019 | Aman | |
| 2019/0188061 A1* | 6/2019 | Scanlon | G06F 9/546 |
| 2020/0005138 A1 | 1/2020 | Wedig | |

FOREIGN PATENT DOCUMENTS

| | | |
|---|---|---|
| JP | 2018067785 A | 4/2018 |
| JP | 201807481 A | 5/2018 |
| JP | 2018156404 A | 10/2018 |
| WO | 2012175703 A1 | 12/2012 |

OTHER PUBLICATIONS

JP Office Action for Japanese Application No. 2021-533556 dated Dec. 14, 2023.

* cited by examiner

OBJECT TRACKING ANIMATED FIGURE SYSTEMS AND METHODS

CROSS-REFERENCE TO RELATED APPLICATIONS

This application is a continuation of U.S. Non-Provisional application Ser. No. 16/862,158, entitled "OBJECT TRACKING ANIMATED FIGURE SYSTEMS AND METHOD," filed on Apr. 29, 2020, which is a continuation of U.S. Non-Provisional application Ser. No. 16/269,471, entitled "OBJECT TRACKING ANIMATED FIGURE SYSTEMS AND METHOD," filed on Feb. 6, 2019, which claims priority from and the benefit of U.S. Provisional Application No. 62/779,373, entitled "OBJECT TRACKING ANIMATED FIGURE SYSTEMS AND METHODS," filed Dec. 13, 2018, each of which is hereby incorporated by reference in its entirety for all purposes.

BACKGROUND

The present disclosure relates generally to the field of amusement parks. More specifically, embodiments of the present disclosure relate to systems and methods utilized to trigger animated figure actions to provide amusement park experiences.

Amusement parks and other entertainment venues contain, among many other attractions, video displays that may provide supplemental content and/or that enhance an immersive experiences for park guests. For example, such displays may include content delivered by animated and/or live-action characters and that relates to the ride or environment. While such pre-recorded content may be scripted to appear as if the characters are interacting with a live audience, e.g., the characters may say hello or ask questions and pause as if waiting for an audience answer, the scripted content does not provide for dynamic or one-on-one audience interactions with a character.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

Provided herein is an animation system. The animation system includes an animated figure, a plurality of sensors of the animation system, and an animation controller. The animation controller includes a processor and a memory, wherein the memory stores instructions executable by the processor. The instructions cause the animation controller to receive guest detection data from the plurality of sensors, wherein the guest detection data is indicative of a presence of a guest near the animated figure, receive shiny object detection data from the plurality of sensors of the animation system, determine an animation sequence of the animated figure based on the guest detection data and shiny object detection data, and transmit a control signal indicative of the animation sequence to cause the animated figured to execute the animation sequence. The animation sequence is responsive to a shiny object detected on or near the guest based on the guest detection data and the shiny object detection data. The animation sequence includes reactive responses in real-time, pre-programmed responses, or a combination thereof.

Also provided herein is a method that includes the steps of receiving guest detection data from a plurality of sensors, wherein the guest detection data is indicative of a presence of a guest near an animated figure, receiving shiny object detection data from a plurality of sensors configured to detect metal objects or shiny objects, determining a presence of a metal object or a shiny object on or near the guest based on the guest detection data and the shiny object detection data, and sending a control signal to cause the animated figure to execute an animation based on the presence of the metal object or the shiny object. The animation sequence includes reactive responses in real-time, pre-programmed responses, or a combination thereof.

Also provided herein is a displayed animated figure system including a display screen displaying an animated figure, one or more cameras, and a display controller. The display controller includes a processor and a memory, wherein the memory stores instructions executable by the processor. The instructions cause the display controller to receive guest detection data, wherein the guest detection data is indicative of a presence of a guest within a predetermined range of the animated figure, receive image data from the one or more cameras, determine a guest location relative to the display screen based on the guest detection data, identify a shiny object on or near the guest based on the image data, determine an animation sequence of the animated figure to display on the display screen based on the guest location and shiny object detection data, and transmit a control signal indicative of the animation sequence to cause the display screen to display the animation sequence. The animation sequence is responsive to a shiny object detected on or near the guest based on shiny object detection data and the guest location based on the guest detection data. The animation sequence includes reactive responses in real-time, pre-programmed responses, or a combination thereof.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present techniques relate to dynamic interaction between an individual, e.g., an amusement park guest, and an animated figure, character, or object. An animated figure may be provided as a plurality of images displayed on one or more display surfaces or as an animated figure or robotic figure. The animation and/or animation sequence may further refer to generating (e.g., via display or physical movement) of facial and/or body movements by the animated figure that are recognizable as an act in response to guest presence and/or actions. In certain embodiments, the techniques facilitate identification of particular objects, such as shiny objects, detected as being worn by or positioned on a guest and that cause a response by the animated figure. In one embodiment, the animated figure may respond to the presence of a detected worn object by appearing to make eye contact, smiling, speaking, running, waving, etc. In certain embodiments, the objects may be shiny objects, e.g., formed from reflective materials that are shiny, reflective, or metallic, including objects found on a person, such as, but not limited to, rings, clothing, necklaces, knives, keys, watches, etc.

Typical guest interactions with an animated figure at an amusement park may be limited to a set of pre-recorded animations for any given interaction. For example, regardless of the guest, gestures made by guests, and/or unique features of the guests, such as their clothing or appearance, the animation provided by the animated figure may be the same. Thus, such interactions may not be perceived as responsive or personalized to the individual guest.

Provided herein are techniques that facilitate interactions between guests and animated figures that appear to be customized and personal. For example, responsive animations may be provided when items worn on the guests are identified, and an animated figure reacts to or responds to such objects. Generally, items guests wear may include one or more shiny objects on the body. For example, guests may wear rings, bracelets, keys, sunglasses, sequence clothing, belts, etc. One or more of these items may be detected by the system, e.g., by a reflection detector. Thus, animations may be customized to animate in response to a particular shiny object worn or carried by a guest. However, providing precise shiny detection, such as detecting where on the body the shiny object is found, and/or determining the exact nature of the shiny object may be complex. For example, while some metal objects are shiny/reflective, not all metal objects are shiny objects. In addition, not all shiny objects are metal or have high metal content. Other types of objects, such as reflective plastics or glass, can be considered shiny.

Figure 1:
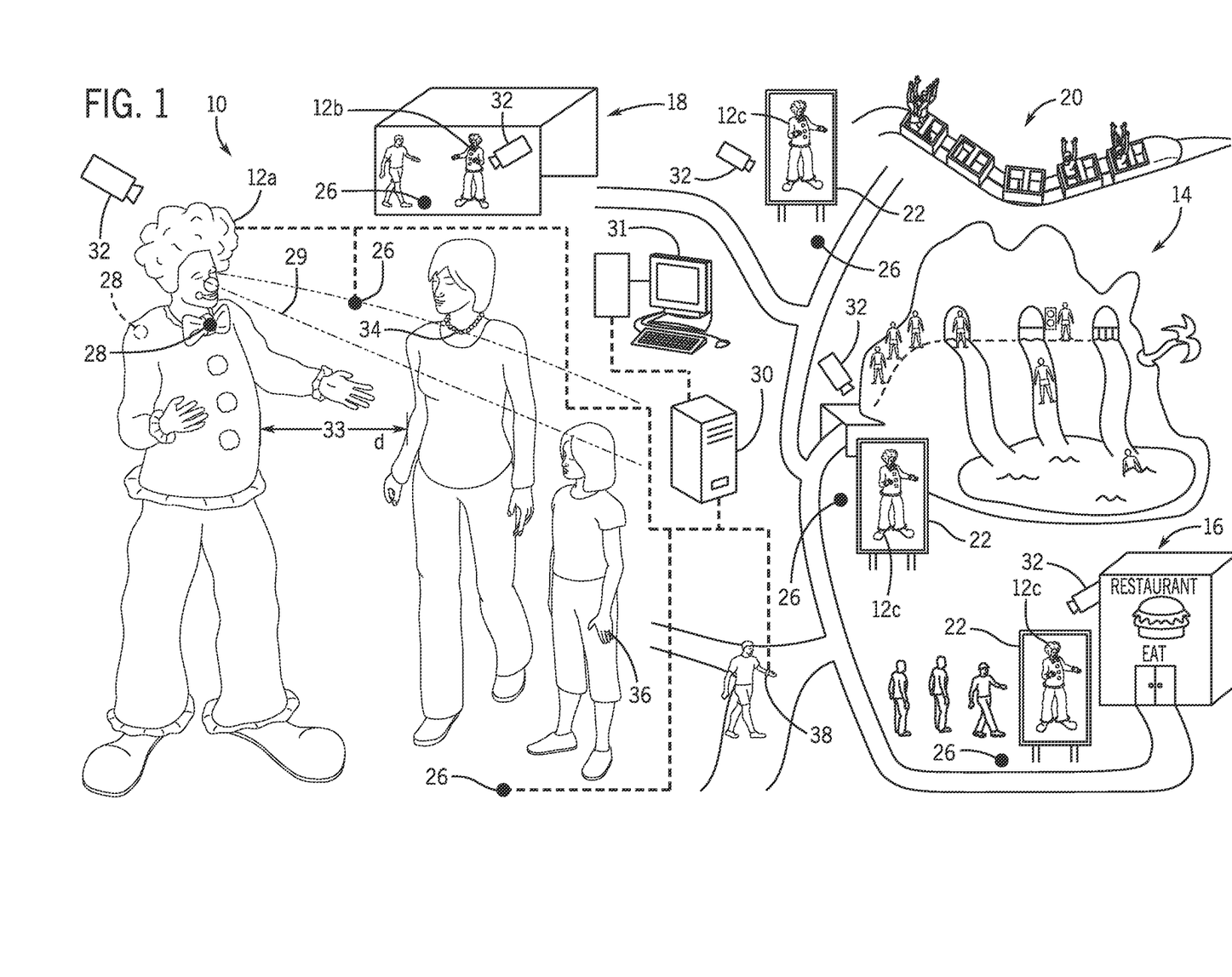
FIG. 1 is a schematic diagram of an amusement park with animated figures, in accordance with an embodiment.

With the foregoing in mind, FIG. 1 is a schematic representation of an amusement park 10 that may operate in conjunction with the disclosed interactive animation system in accordance with present embodiments. In particular, the amusement park 10 includes one or more animated FIG. 12 that may track and react to a detection of a shiny object on a guest, on or around various amusement park attractions. In the depicted embodiment, the amusement park 10 attractions may include a water attraction 14, a restaurant 16, a virtual game room 18, and a track-based ride 20. Different embodiments of the animated FIG. 12 may be found throughout the amusement park 10, and each of them may detect and track shiny objects and/or guests (e.g., guest gestures), and react in a manner that the guests perceive as a response to the detected object or guests. For example, the water attraction 14, restaurant 16, and a track-based ride 20 may include display screens 22 that display images of an animated FIG. 12. The screens 22 may depict an animated FIG. 12 that reacts to guests and/or a specific shiny object detected. Similarly, an animated FIG. 12 may also be a virtual embodiment or hologram in a virtual game experienced in the virtual gaming room 18.

It should be noted that although examples provided herein may describe a physical or robotic animated FIG. 12, the approaches disclosed may be used in other animations, such as displayed, virtual, or holographic animated figures, as described above. Accordingly, as provided herein, the disclosed animation or animation sequence may refer to animation rendered on a display or holographic figure or animation caused by physical movement of a robotic figure. Thus, the present examples should be understood to merely reflect a real-world example of an animated figure in order to provide useful context to facilitate discussion, and should not be viewed as limiting the applicability of the present approach. Moreover, although the present approach relates to detecting shiny objects on guests, approaches disclosed may be used in other contexts for other detectable features of interest. Thus, the present approach should be understood as being applicable to any situation in which animated figures capable of generating a reaction based on detectable feature of interest may be present.

As depicted, the animated FIG. 12 may be controlled to react or be animated via an animation controller 30. In one embodiment, the animation controller 30 may be centralized and synced to at least one or more animated FIG. 12 (e.g., physical animated FIG. 12a, displayed holographic or virtual animated FIG. 12b or displayed animated FIG. 12c via control of displays, e.g., hologram projector or display screens 22) located throughout the amusement park 10. When the animation controller 30 detects guest presence, guest gestures, shiny object, and/or gestures associated with the object, via one or more sensors located on or around the animated FIG. 12, an animation control signal may be sent to one or more systems controlling the animated FIG. 12. The communications (e.g., sensed data indicating guest and/or shiny objects) may also be sent to a monitoring system 31. The monitoring system 31 may be an administrative system that not only monitors the animation changes, such as animations sent from the animation controller 30 in response to shiny objects detected and tracked, but may also control or reconfigure the animation controller 30. In this manner, the monitoring system 31 may reset animation options or override automated animations determined by the animation controller 30. For example, the animation controller 30 may automatically send an animation to the animated FIG. 12 in response to detection of a particular shiny object. Similarly, an operator may manually stop an animation via a stopping mechanism (e.g., button) to override the animation if the operator finds any issues with the animated FIG. 12 beyond those determined by the animation controller 30. The monitoring system 31 may also be used to recalibrate sensors on or around the animated FIG. 12. In certain embodiments, the monitoring system 31 and the animation controller 30 may be implemented as a single controller.

As previously mentioned, the animation controller 30 may utilize a combination of sensor data received by sensors on or near the animated FIG. 12 to detect a shiny object and in response, control animation based on the detected shiny object. As shown, shiny object detectors 26 may be used as a sensor mechanism to detect the presence of a shiny object, which may indicate a shiny object on a guest. The shiny object detectors 26 (e.g., reflectivity sensors, metal object detectors, shiny object detectors, metal sensors) generate shiny object detection data. Although shiny object detectors 26 are shown and discussed herein to detect reflectivity of a material and/or object, the shiny object detectors 26 may include detection of any shiny object, reflective objet, metal object, metallic material, including but not limited to, shiny or metal objects, such as gemstones, glass, sequences, rings, necklaces, knives, keys, sunglasses, watches, etc. The shiny object detectors 26, e.g., reflectivity sensors may assess a reflectivity of a material using optical sensors and, based on the reflectivity, determine that the object is shiny. Furthermore, the shiny object detectors 26 may include one or more optical, magnetic, infrared, or inductive metal detectors. Further, the shiny object detectors may be reflectivity sensors configured to assess a reflectivity of a material using optical sensors and, based on the reflectivity, determine that the object is shiny and likely to be a shiny object of interest. Certain types of shiny objects that are worn objects (e.g., jewelry) may be of more interest than others (e.g., bright white teeth). To differentiate between the reflectiveness of white teeth and jewelry, additional analysis (e.g., using camera data) may be used to estimate that the location of a shiny object on a finger, ear, neck, or wrist is likely to be a shiny object of interest, while a location on or in a mouth is less likely. While an approach weighting certain body locations may fail to capture individuals with metal braces, such an approach enriches the identified shiny objects for the types of object of interest (e.g., worn objects).

In one embodiment, a reflectivity sensor is an optical sensor configured to measure intensity of light reflected from a surface of the object of interest. The reflectivity sensor may be integrated with one or more cameras 32 such that camera image data is used as an input to determine if captured objects are reflective. The assessment may be performed on a pixel-by-pixel basis, such that reflectivity of an individual pixel is assessed. If a sufficient number of adjacent pixels identified as being from an individual object (e.g., having similar color properties, located at a likely object location, or within a predefined boundary) are above the reflectivity factor threshold, the object is categorized as shiny. In one embodiment, specular or diffuse reflective properties may be assessed. Diffuse reflectivity may be observed over a larger percentage of a surface area of an object, while specular reflectivity may be observed at a fixed range of angles depending on image capture position and a position of available light sources. A shiny object may include both types of reflective properties. Accordingly, the camera data may be used to identify small shiny regions of high reflectivity (specular reflection) within an object or that swamp other types of reflectivity (e.g., a flashing diamond appearing as a bright halo in a camera image). Because individuals are moving within the environment, camera data over a time window may be used to track specular reflectivity at isolated moments to identify a shiny object, even if the camera data is indicative of diminished reflectivity as the individual, and their worn object, moves away from the specular reflective angle. The controller may identify temporarily or intermittently shiny objects as being shiny objects if estimated reflection at one point in a time window is above a threshold, even in the context of lower reflectivity at adjacent time points.

Moreover, the shiny object detectors 26 may be placed on or around an animated FIG. 12 of an attraction at a predetermined proximity from the animated FIG. 12, such that the animation controller 30 may gauge signal strength. Thus, when a shiny object is detected within the proximity, the shiny object detectors 26 may transmit a signal pulse detectable by the animation controller 30. The signal may be generated in a manner that may allow the animation controller 30 to determine an accurate detection of a shiny object. Furthermore, the shiny object detectors 26 may allow detectability for moving objects. Thus, the signal may indicate that the shiny object detected may be on a guest. In this manner, stationary shiny objects (e.g., stationary rides made of metal) of amusement park 10, such as attractions 16, 14, 18, and 20, that may be near the animated FIG. 12 may not be detected to falsely indicate a shiny object of interest.

In some implementations, the shiny object detector 26 may be sensitive to different types of shiny objects. For example, the shiny object detector 26 may be an optical or photoelectric sensor that may determine a shiny object based on a user defined threshold for reflectivity of the object. In general, whenever light travels through a material or medium, part of the light is reflected from the surface, e.g., as described by a reflection percentage, and the remainder of the light is refracted. Thus, reflectivity may be measured by a reflection factor % or refractive index. The refractive index references a dimensionless number to describe how fast light propagates through material. It also determines how much a path of light is bent (e.g., refracted) when entering the material.

In some embodiments, the threshold for determining a shiny object may be based on the amount of light reflected or the reflection factor. By way of example, the amount of light reflected when passing through a non-shiny object, such as sandstone material, is 20-40% while the reflection factor of polished aluminum is 80-87%. Thus, in one embodiment, the threshold for reflectivity may be a reflection factor of at least 80% when light passes through the particular object. In another embodiment, the threshold may be a reflection factor of at least 70%, such that at least 70% of light is reflected from the object. Furthermore, in other embodiments, the threshold for determining a shiny object may be based on a range of light reflected, such as a reflection factor of 70%-100%.

Additionally or alternatively, the threshold may be based on the refractive index rather than the reflection factor or amount of light reflected. By way of example, the refractive index for aluminum is 1.373, such that light travels 1.373 times faster in vacuum than through metal. The refractive index for other shiny objects, such as but not limited to, silver is 0.266 and a diamond is 2.417. Accordingly, a shiny object determination may be made by the shiny object detector 26 based on a refractive index of the object of at least 0.2 or a range of 0.2-2.5. Some shiny objects, such as silver metal objects, may be significantly more refractive than the others, such as diamonds. Accordingly, determining a particular threshold for reflectivity based on either a reflection factor percentage or a refractive index may be difficult. Moreover, non-shiny objects that may not be of interest may also fall within the reflection factor % or refraction index threshold. For example, snow has a reflection factor of 80%, which may be categorized as shiny based on the threshold in some embodiments, causing inaccurate shiny object determinations. Furthermore, the amount of light reflected by an object and how it is reflected may be dependent upon the degrees of smoothness or texture of the surface of the object. For example, when imperfections are smaller than wavelength of the incident light, virtually all the light is reflected equally. To account for the varying materials and textures of shiny objects, along with the varying reflectivity of shiny objects, a shiny object may be determined using additional sensor methods as described herein, such as by mental sensors, cameras, etc.

For example, the shiny object detector 26 may include a metal detector to determine a shiny object, such as a very low frequency (VLF) detector or a pulse induction (PI) detector, or the like. The VLF detector may transmit an electrical current producing a magnetic field under and/or below a surface, and receive signals that interfere with the magnetic field. Depending on the type of metal, such as highly magnetic objects (e.g., steel or iron) or low magnetic objects (e.g., gold), the magnetic pulse interference may change to indicate type of metal detected. In another example, a PI detector may pulse current through a coil of wire to generate a brief magnetic field with each pulse and cause another current, a reflected pulse, to run through the coil. The reflected pulse is short (e.g., 30 microseconds). If a metal object is detected, the pulse creates an opposite magnetic field in the object, causing the reflected pulse or causing it to last for a longer duration, indicating a metal detected. Thus, the animation controller 30 may interpret the pulse signals for a specific class or category of metal objects, and thus, a shiny object. For example, necklaces, rings, and bracelets detected may belong to a classification group of jewelry that may be of interest when determining an appropriate animation. The characteristics that the metal detector may use to determine classification may include, but are not limited to, the amount of metal typically used for body jewelry, type of metal (e.g., gold), etc.

As depicted, the shiny object detectors 26 may be used to detect shiny objects on a guest wearing a necklace 34 and a child wearing a small ring 36. Thus, the animation controller 30 may send a signal for the animated FIG. 12 to react in a manner indicating the detection of jewelry, for example, by changing its facial expression to indicate that it is in awe of the jewelry (e.g., pointing to the detected jewelry, enlarged eyes, and excited smile). Although shiny object detectors 26 may be used to detect shiny objects and/or classification of a shiny object, it may be difficult to precisely classify the shiny object and/or track the location of the object on the guest. Continuing with the example with the child wearing a small metal ring 36, detecting a small shiny object may be especially difficult. Thus, determining a classification for a shiny object and/or tracking it on a guest to accurately animate the animated FIG. 12 may be difficult with the use of a reflectivity or metal sensors or detectors, such as shiny object detectors 26.

Accordingly, other sensor mechanisms may be used in combination with sensors configured to provide shiny detection data, i.e., the reflectivity sensors or metal detectors, such as a camera 32 or a series of cameras 32 that may be installed around the animated FIG. 12 and/or around the amusement park 10. The cameras 32 may be set up at a predetermined distance from the animated FIG. 12. The predetermined distance may be a distance that may allow a full view of a guest body image and areas that the guest may wear shiny objects. For example, the camera 32 may view a 20 ft. (e.g., 6 meter) circumference around the animated FIG. 12. In this manner, any guests near the animated FIG. 12 that may trigger an animation may be easily detected. Additionally or alternatively, the cameras 32 may be integrated into the body of the animated FIG. 12. The integration may be positioned such that there is a clear view of guests and/or shiny objects to be perceived, whether the guests are stationed in front of or behind the animated FIG. 12. For example, integrating a camera 32 in the eyes of the animated FIG. 12 may allow for detection of guests interacting in front of the animated FIG. 12.

The cameras 32 may also be used to capture data used as inputs to one or more processes of the system as provided herein. In one example, the camera 32 data may be used by the animation controller 30 to detect human presence. That is, the presence of a captured image of a person is used at least in part to trigger an animation. In another example, the camera data may be processed to identify a guest using skeletal tracking, facial recognition, and/or body recognition. The guest detection and/or facial recognition may also allow a triggering of other sensor mechanisms to subsequently detect shiny objects on the guest. For example, after detecting a face, and thus a guest, the camera 32 may initialize the shiny object detector 26 to report on or send an input of shiny object detected near the guest, which may then allow for the animated figure to track the shiny object and/or guest and provide a responsive animation. The skeletal tracking may include using real-time or captured images of guests by the cameras 32, and comparing the images to recognized skeletal models to indicate a human skeleton detection. For example, the skeletal model may include relative positioning of essential joints, bones, and limbs of a human skeleton. Thus, comparing captured images of guests and the skeletal model may allow for human face and body detection. The skeletal tracking data may be further processed to precisely identify a face or body using facial recognition and body recognition, and may also be used to identify shiny objects on preferred body parts or regions. The facial image detection may consider multiple facial features as a whole to determine that a face has been accurately detected. The features considered may be points of facial interest and their intersection (e.g., two eyes aligned along a horizontal line in close proximity to a nose along a vertical line, detected at or near a point between each eye). Furthermore, the cameras 32 may be used for full body detection, such that body features may be used to precisely identify a guest, and subsequently trigger detection of shiny objects. For example, the body detection features may consider body features and their intersection, such as face, arms, and legs. Moreover, the cameras 32 may be used for thermal recognition to detect body-heat, which may be used to further accurately predict the presence of a guest. Furthermore, the camera 32 may also include infrared (IR) capabilities, such that the camera may provide night vision, thereby detecting guests and/or objects via shape recognition (as discussed below) in both the day and night.

Additionally or alternatively, the camera 32 may be used for shape recognition to identify shiny objects of interest. The cameras 32 may be configured to specifically detect common pieces of shiny objects found on a guest. The shapes recognized may be circular rings, circular necklaces, belt buckles, key shapes, etc. The cameras 32 may be configured to perform the skeletal tracking, facial/body recognition, and shape recognition in sequence to allow for an accurate identification of a shiny object found on a guest. For example, after detecting a guest via facial/body recognition or body-heat recognition, the animated figure system may determine a body image and subsequently apply shape recognition to specific body areas that are considered to be likely to have a shiny object of interest. For example, a search for metal objects may be limited to the identified waist region for belts, identified hands or toes for rings, identified neck or face for necklace shapes, etc. Further, additional verification of detected metal may also incorporate camera data. If a shiny object is detected at an identified guest hand, camera data indicating an annular shape corresponding to the potential shiny object is indicative of a ring. Furthermore, in some implementations, the cameras 32 may also capture movements (e.g., gestures) of the guest and use those captured movements to further simulate an animation for the animated FIG. 12. Thus, the shiny objects detected may also be used to precisely detect and track a guest rather than providing an animation that may be perceived as a response to the shiny object itself.

Moreover, one or more additional sensors 28, e.g., proximity sensors, thermal sensors, optical sensors, may also be used to detect human presence. The additional sensors 28 may be installed on the physical body of a robotic or animated FIG. 12a or integrated near, into, or on the display screen 22 displaying the animated FIG. 12c. In this manner, if a guest touches the animated figure, the animation controller 30 may animate the animated FIG. 12 to react accordingly. For example, if a guest touches the back shoulder of the animated FIG. 12, the animated figure may be instructed to react as if it is afraid, such as by running away from the guest. The additional sensors 28 may also be used in conjunction with other sensor mechanisms, such as the cameras 32 or shiny object detectors 26, to trigger detection of a shiny object. Thus, based on the detection of guest presence detected by the thermal sensors, the cameras 32 may initiate a thermal imaging and shape recognition to detect shiny objects on guests. In certain embodiments, the additional sensors 28 may detect if the guest is within range of the animated FIG. 12. That is, if a sensed distance 33 is less than a threshold and/or if the guest is within a hypothetical field of view 29 of the animated FIG. 12, the animation may be triggered.

Other sensor mechanisms may include radio frequency identification (RFID) tags 38 incorporated into guest wearable devices (e.g., bracelets). The RFID tags 38 may communicate with an electronic reader incorporated into an attraction and/or around an animated FIG. 12 to indicate presence of the tag. The RFID data may be utilized to indicate a presence of the guest, such as to trigger shiny object recognition to detect and track a metal object.

It should be understood that the animated FIG. 12 may be at rest or operating under default instructions in the absence of the guest. For example, the displayed animated FIG. 12c may be active on the display screen 22. The animated FIG. 12 may be generally looking around for guests or performing other tasks until an interactive animation is triggered based on detection of the guest and concurrent detection of a metal object on or near the guest.

Figure 2:
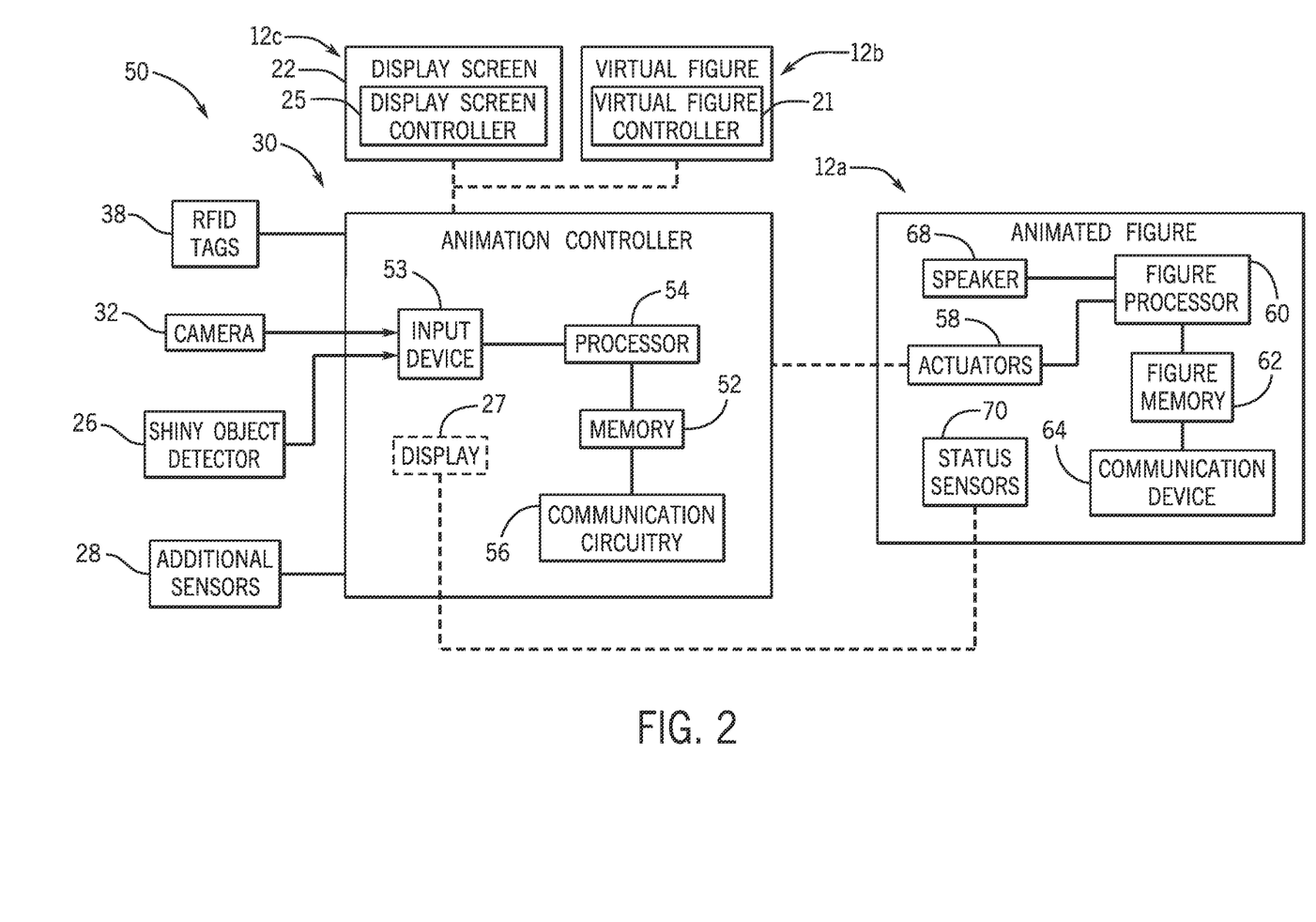
FIG. 2 is a block diagram of an animated figure system including the animated figure and an animation controller, in accordance with an embodiment, in accordance with an embodiment.

As previously mentioned, the combination of detected sensor signal indicative of detection of guest presence and/or shiny objects may be sent to an animation controller 30, which may then determine a corresponding animation sequence. To illustrate, FIG. 2 shows a block diagram of an animated figure system 50 with an animation controller 30 and an animated FIG. 12 (e.g., animated FIG. 12a, virtual animated FIG. 12b, and/or displayed animated FIG. 12c).

The animation controller 30 (e.g., electronic controller) may include a memory 52, a processor 54, communication circuitry 56, and an input device 53. In certain embodiments, the memory 52 is configured to store instructions, data, and/or information, such as a library of animations (e.g., database or selectable available animation options). Additionally or alternatively, the memory 52 may include a user-defined algorithm for a responsive animation. For example, the algorithm may include tracking the detected shiny object using the animated FIG. 12 features, such as eyes. Thus, the algorithm may cause the eyes of the animated FIG. 12 to track and follow the detected shiny object. It should be noted that although examples provided herein may describe the animation library, the approaches disclosed may use other animations or algorithms, or both, such as algorithms that cause the animated FIG. 12 to track and react (e.g., follow) the shiny object rather than selecting animations from a stored library, such that the animation may be perceived as responsive to the tracked shiny object. Additionally or alternatively, the algorithm may track a shiny object as means to track a guest, and then provide animations that may be responsive to the guest and/or guest gestures. Furthermore, although examples provided herein describe the animated FIG. 12 as an animated FIG. 12a, the approaches disclosed may use other animated figures, such as but not limited to, a displayed virtual animated FIG. 12b, a displayed animated FIG. 12c, or the like.

As discussed in more detail below, in certain embodiments, the processor 54 is configured to receive input signals, from the input device 53, relating to detecting guests, and/or shiny objects, and/or guest gestures from one or more sensors previously described, to select an animation from the library of animations based on the received inputs, and subsequently provide control signals to a speaker 68, and/or an actuator 58 of the animated FIG. 12, based on the received inputs and/or in accordance with the selected animation. In this manner, the animation controller 30 may control the animations of the animated FIG. 12. The sensor data may be provided to the input device 53 by the camera 32, the shiny object detectors 26, additional sensors 28 (e.g., proximity sensors or thermal sensors), and/or RFID tags 38, as previously described. It should be understood that the illustrated system is merely intended to be exemplary, and that certain features and components may be omitted and various other features and components may be added to facilitate performance, in accordance with the disclosed embodiments.

After receiving the sensor data via the input device 53, the animation controller 30 may facilitate control of the animated FIG. 12 using the processor 54 to select an animation from the library of animations that may be stored in the memory 52, based on the sensor data. The animation library may include, for example, a list of available animations, such as a first animation option (e.g., smile), a second animation option (e.g., say greeting), a third animation option (e.g. laugh and wave), a fourth animation option (e.g., say goodbye), etc. In certain embodiments, the animation options may be stored in the memory 52. In some implementations, the processor 54 may be configured to select one or more animations to be performed in sequence (e.g., animation sequence).

In certain embodiments, the animation controller 30 may be used to control the various components of the animated FIG. 12 and it should be understood that any of the features, functions, and/or techniques disclosed herein may be distributed between the animated FIG. 12 and the animation controller 30 in any suitable manner, such as the animation controller 30 and the animated FIG. 12 may be integrated into the animated FIG. 12. In the depicted embodiment, the processor 54 of the animation controller 30 may execute instructions stored in the memory 52 to perform operations, such as selecting an animation (e.g. smile, speak, point to shiny object, run away from shiny object, etc.) to execute on the animated FIG. 12. As such, in some embodiments, the processor 54 may be one or more general purpose microprocessors, one or more application specific processors (ASICs), one or more field programmable gate arrays (FPGAs), or any combination thereof. Additionally, the memory 52 may be a tangible, non-transitory, computer-readable medium that stores instructions executable by and data to be processed by the processor 54. Thus, in some embodiments, the memory 52 may include random access memory (RAM), read only memory (ROM), rewritable non-volatile memory, flash memory, hard drives, optical discs, and the like.

Furthermore, the animation controller 30 may enable the communication circuitry 56 to interface with various other electronic devices, such as the components illustrated in the animated FIG. 12. For example, the communication circuitry 56 may allow the animation controller 30 to communicatively couple to a network, such as a personal area network (PAN), a local area network (LAN), and/or a wide area network (WAN). Accordingly, in some embodiments, the animation controller 30 may process data from the input device 53 and communicate it to the animated FIG. 12 (e.g., animated FIG. 12a) via the communication circuitry 56. For example, after processing sensor data inputs from the input device 53, the processor 54 may enable the communication circuitry 56 to wirelessly transmit data to the animated FIG. 12 to enable its face or body to output one or more animations (e.g. smile, speak, point to metal object, run away from metal object, etc.). Additionally or alternatively, the processor 54 may enable the communication circuitry 56 to wirelessly transmit data to a virtual figure controller 21 of the virtual animated FIG. 12b to execute animations. Similarly, the sensor data may be wirelessly transmitted to a display screen controller 25 of the display screen 22 to control a displayed animated FIG. 12c. Although not explicitly shown, the display screen controller 25 and the virtual figure controller 21 may each include a memory similar to a figure memory 62 of the animated FIG. 12a to store animations or algorithms for performing animations and a processor similar to a figure processor 60 of the animated FIG. 12a to process and execute the animations on the respective animated FIGS. 12b, 12c. In further configurations, the communication circuitry 56 may be wirelessly connected, or may be connected via a wired connection, to the animated FIG. 12.

In some implementations, the animation controller 30 may also be configured to display an indication of available animations (e.g., a list of animations or algorithms stored in the library in the memory 52), as well as an indication of the selected movements, features, and/or animation on a display 27 (e.g., a display of text, images, graphics, or the like) of the animation controller 30 for visualization purposes. The display may also be available to the monitoring system 31 (see FIG. 1) for monitoring or making administrative changes to the animation controller 30 and/or the animated FIG. 12. Thus, an operator monitoring the monitoring system 31 may view the display 27 to have a visual indication of possible animations, and may subsequently modify the possible options, such as by expanding the animation option library to improve the interaction of the animated FIG. 12 with guests. Moreover, using the display 27, the operator may override and assign one or more available animations to one or more sensed guest interactions and/or shiny objects. Thus, in some embodiments, the multiple animations provided on the display 27 may be changed, modified, switched, delayed, or deleted by the operator, thereby enabling updated animations. In some embodiments, the processor 54 may be configured to instruct the display 27 to display a list of previously performed animations corresponding to sensor data to facilitate visualization and to facilitate selection of future animations.

The display 27 may be further utilized to provide various other information. For example, in some embodiments, the camera 32 may communicate with the display 27 to show images (e.g., still or real-time images, such as video) of guests and currently implemented animation (e.g., current movements of the animated FIG. 12), which may have been communicated to the animated FIG. 12 by the communication circuitry 56. Furthermore, the displayed images may be used by the operator to modify the animation library.

Once the animation signal is sent from the animation controller 30 to the animated FIG. 12 (or the display screen 22 displaying the animated FIG. 12), the animated FIG. 12 may implement the corresponding animation. As shown, the components used to implement the animation in the animated FIG. 12 may include the actuators 58, the figure processor 60, the figure memory 62, the communication device 64, and the speaker 68. The figure processor 60 may receive an animation signal from the animation controller 30, and the figure processor 60 may process the signal to provide instructions to modify the actuators 58, and/or speakers 68 accordingly. The figure processor 60 may execute instructions stored in the figure memory 62 to perform operations received from the animation controller 30, such as determining the complete motion profile (e.g., animations) to execute on the animated FIG. 12. As such, in some embodiments, the animated FIG. 12 may include one or more general purpose microprocessors, one or more application specific processors (ASICs), one or more field programmable gate arrays (FPGAs), or any combination thereof. Additionally, the figure memory 62 may be a tangible, non-transitory, computer-readable medium that stores instructions executable by, and data to be processed by, the figure processor 60. Thus, in some embodiments, the figure memory 62 may include random access memory (RAM), read only memory (ROM), rewritable non-volatile memory, flash memory, hard drives, optical discs, and the like.

The actuators 58 may be any suitable actuators, such as electromechanical actuators (e.g., linear actuator, rotary actuator, etc.). The actuators 58 may be located inside the animated FIG. 12 and be configured to adjust certain features or portions of the animated FIG. 12 (e.g., the eyes, eyebrows, cheeks, mouth, lips, ears, arms, legs, or the like). For example, a rotary actuator may be positioned inside the animated FIG. 12 along the outer cusps of the lips of the animated FIG. 12 to cause the face of the animated FIG. 12 to smile in response to a control signal (e.g., from the figure processor 60). As a further example, the animated FIG. 12 may contain an electric linear actuator that drives the position of the eyebrows (e.g., to frown) of the animated FIG. 12 in response to a control signal. Similar actuators may be used to provide other body feature movements, such as to move the legs or arms of the animated FIG. 12. In some embodiments, the actuators 58 may enable the animated FIG. 12 to provide any of a variety of projected facial or body feature gestures, physically animated facial or body gestures, or combinations thereof. Furthermore, the speaker 68 may project pre-recorded phrases as an animation option in the animation library.

In certain embodiments, the animated FIG. 12 may include one or more status sensors 70 configured to monitor a component status and/or an animated FIG. 12 status (e.g., to determine whether a performed animation does not correspond to the selected animation), and an indication of the status may be displayed on the display 27 of the animation controller 30. For example, a status sensor 70 may be associated with each actuator 58 and configured to detect a position and/or movement of the actuator 58, which may be indicative of whether the actuator 58 is functioning properly (e.g., moving in an expected way based on the selected animation). In certain embodiments, the animation system may be configured to provide an indication of a component failure, a current animation selection, an upcoming animation selection, a currently playing animation, or the like, via the display 27.

Furthermore, the communication device 64 may enable the animated FIG. 12 to interface with various other electronic devices, such as the components of the animation controller 30. For example, the communication device 64 may enable the animated FIG. 12 to communicatively couple to a network, such as a personal area network (PAN), a local area network (LAN), and/or a wide area network (WAN). In further embodiments, the animated FIG. 12 may be communicatively coupled via a wired (e.g., land line) connection to the various components of the animated FIG. 12 and/or the animation controller 30. Accordingly, in some embodiments, the figure processor 60 may process the data received by the communication device 64 in response to the input data received by the input device 53 of the animation controller 30, and transmitted to the animated FIG. 12 via the communication circuitry 56. For example, the animation controller 30 may be configured to automatically, wirelessly transmit the animation signal after determining an appropriate animation. Additionally or alternatively, an operator monitoring the monitoring system 31 (see FIG. 1) may select one or more buttons that may also wirelessly transmit animation data.

Figure 3:
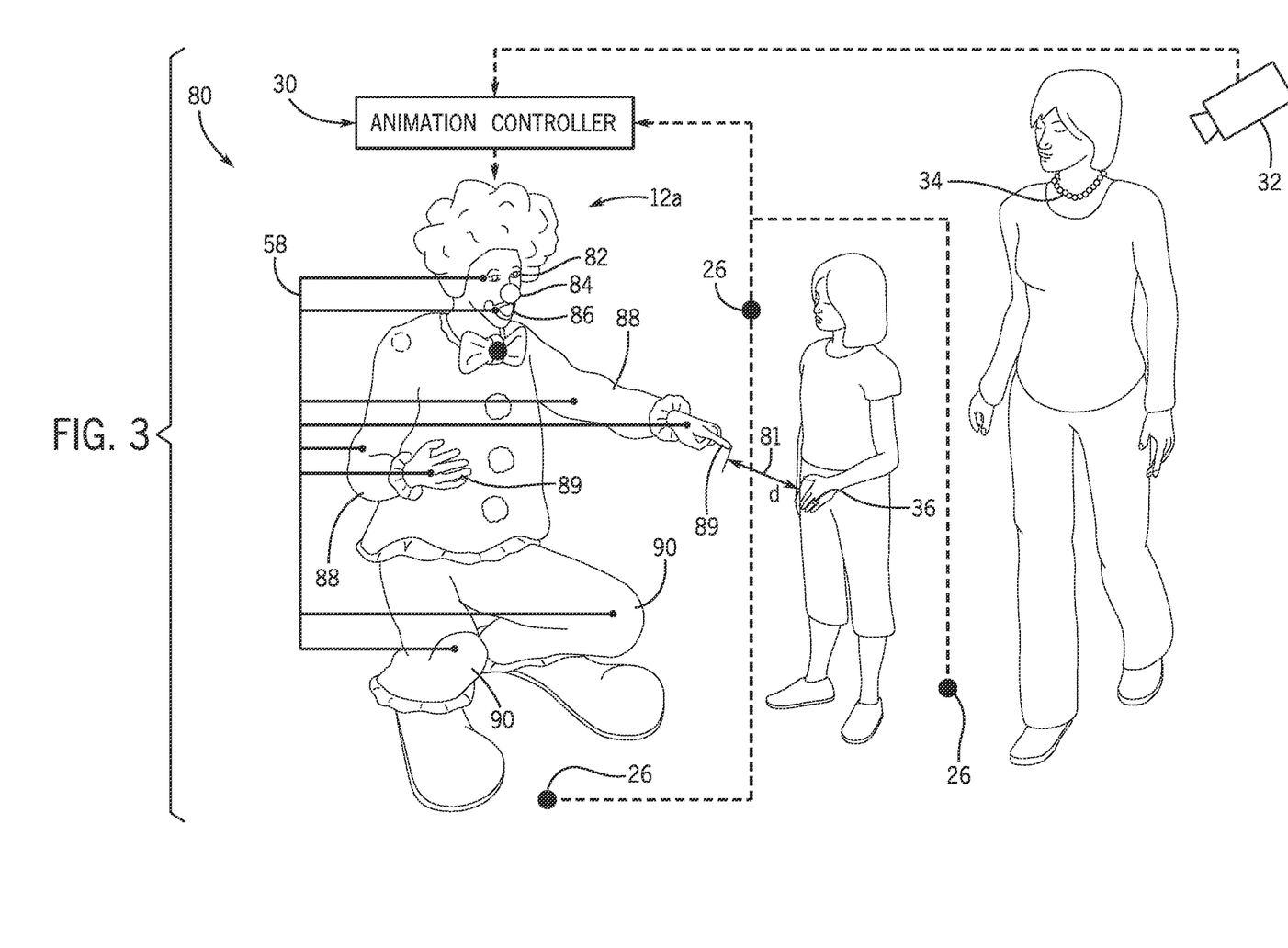
FIG. 3 is a block diagram of the animated figure executing an animation in response to a particular shiny object detected, in accordance with an embodiment.

FIG. 3 is a schematic diagram 80 of an embodiment of the animated FIG. 12, shown as an animated FIG. 12a, performing an animation, in accordance with aspects of the present disclosure. The depicted embodiment may include the animated FIG. 12 interacting with guests wearing shiny objects. As shown, the camera 32 is positioned to view both the animated FIG. 12 and guests who may come within a predetermined distance or range 81 from the animated FIG. 12 (e.g., as estimated by a proximity sensor or the camera 32) that triggers animation. Shiny object detectors 26 are positioned to detect shiny objects that may come within a range that may also trigger animation. The sensed data provided by the camera 32 and shiny object detectors 26 may be communicated to the animation controller 30. Specifically, the animation controller 30 may calculate a two-dimension (2D) XY-plane map using sensor data input, such that the animated FIG. 12 is animated for guests detected within the predetermined range 81 of the animated FIG. 12 on the XY-plane range. For example, the map may include a view of the animated FIG. 12 and predetermined range 81, such that the animated FIG. 12 is the point of origin and any guests detected are determined to be at X distance (horizontal distance) and Y distance (vertical distance) from the animated FIG. 12. The XY-plane may include four quadrants so that the guest may be detected at a negative distance (below or behind) the animated FIG. 12 on the XY-plane but that are still within the predetermined range 81. The animation controller 30 may use the XY-plane data to estimate guest location relative to the animated FIG. 12 based on sensor data (e.g., proximity sensor) rather than focusing on or tracking guests using the fixed camera 32. The estimation may be used to trigger animations in the animated FIG. 12.

Continuing with the example of a guest wearing a necklace 34 and a child wearing a ring 36 as described in FIG. 1, the two guests may be within the predetermined range 81 to trigger animation. Since both guests are wearing shiny objects and are within range 81 to be detected, the animated FIG. 12 may be instructed (e.g., via a user defined algorithm stored in the memory 52) by the animation controller 30 to track and react to the guest closest in proximity to the animated FIG. 12. In other embodiments, if the guest is wearing multiple shiny objects, the animated figure may be instructed to react to the first detected shiny object and/or stronger shiny signals (e.g., stronger metal detection or higher reflectivity). Additionally or alternatively, if there are multiple shiny objects within the predetermined range 81, the animated figure may remap its tracking and corresponding animations to the next strongest shiny object signal producing object within the range 81 after a predetermined time period of tracking a guest.

In this example, the child is in closer proximity to the shiny object detector 26 located by the animated FIG. 12, and thus, the animated figure may react to the shiny object found on the child's body and may disregard shiny objects detected on other guests. Using different recognition techniques, such as, but not limited to, metal detection classification or shape recognition, as previously discussed, the animation controller 30 may determine that the shiny object worn is a ring 36. In some embodiments, the animated FIG. 12 may be a character that is fascinated by jewelry. Thus, the animation controller 30 may look up the corresponding animation or animations in the animation library and send the signal through communication circuitry 56. Here, a detection of jewelry may correspond to an animation causing the animated FIG. 12 to track and point towards the identified piece of jewelry and show a surprised expression. Additionally or alternatively, the animation instructions may also include leveling the animated FIG. 12 with the detected guest and/or shiny object. Thus, animated FIG. 12 may be designed with moveable features to support the various animations, such as eyes 82, a nose 84, a mouth 86, arms 88, fingers 89, and legs 90. The features may be actuated via the respective actuators 58 in the animated FIG. 12 based on a control signal (e.g., received from the processor 54 of the animation controller 30). As discussed above, the speaker 68 may also be enabled to project words and/or phrases to interact with a guest as part of an animation.

Thus, in the current example, the legs 90 may be actuated to bend down and have the animated FIG. 12 become leveled in height with the child, and the arms 88 and fingers 89 may be actuated to continue tracking and pointing towards the ring 36. Furthermore, the eyes 82 may be actuated to become larger, and the mouth 86 may be actuated to open and become circular. Thus, the animated FIG. 12 features may be actuated to execute the animation selected from the animated library. As previously mentioned, rather than selecting an animation from an animation library, an algorithm may be executed that may cause the animated FIG. 12 to fixate on the detected shiny object and to track the shiny object in a recognizable manner, such as using its eyes to track the ring 36. If the guest moves out of the range of detection, the animated FIG. 12 may be instructed to move back to its initial position, and the moveable features may be actuated accordingly. In this manner, the animated FIG. 12 may interact with a guest based on the tracked guest and/or the tracked shiny object observed on the guest for as long as the shiny object is within the predetermined range 81.

Figure 4:
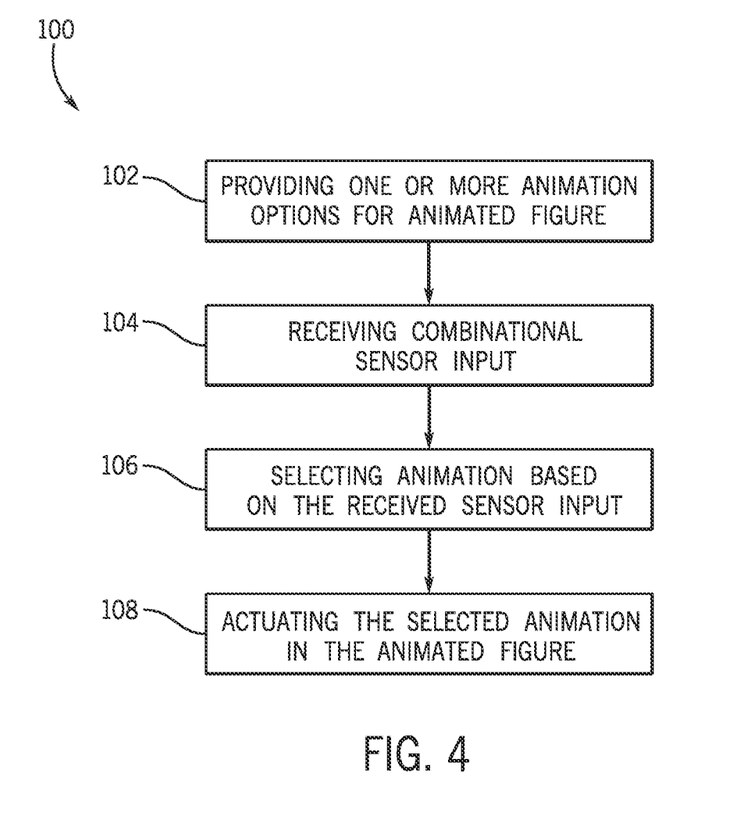
FIG. 4 is a process flow diagram of executing an animation in the animation figure, in accordance with an embodiment.

FIG. 4 is a process flow diagram for a method 100 for outputting an animation to the animated FIG. 12. It should be noted that the method 100 may be performed as an automated procedure by a system, such as the animated figure system 50 having the animated FIG. 12 and/or the animation controller 30. Although the flow diagram illustrates the steps in a certain sequence, it should be understood that the steps may be performed in any suitable order and certain steps may be carried out simultaneously, where appropriate. Further, certain steps or portions of the method 100 may be omitted and other steps may be added. The method 100 may be carried out in response to a guest and/or shiny objects detected by sensor data input (e.g., via the camera 32, shiny object detector 26, additional sensors 28, and/or the RFID tags 38), or the like.

As illustrated, the method 100 generally includes providing one or more available animation options within the animated FIG. 12 (block 102), receiving sensor input (block 104), selecting a corresponding animation based on the received sensor input (block 106), and actuating the selected animation in the animated FIG. 12 (block 104).

In more detail, the method 100 may provide one or more available animation options for the animated FIG. 12 (block 102). As discussed in detail above, there may be a list of available animation options (e.g., smile, speak, wave, etc.) from an animation library (e.g., stored in the memory 52, which may further be displayed on display 27) that may be executed on the animated FIG. 12. Moreover, animation options that may be stored in memory 52 but not a library may include tracking a detected shiny object via the features (e.g., move eyes to follow shiny object) of the animated FIG. 12. Furthermore, the animation option may additionally or alternatively include tracking a guest by using a shiny object on the guest to track. The animation options may be determined automatically via the processor 54 of the animation controller 30. Additionally or alternatively, the animations may be presented to an operator via the display 27. The available animation options of the animation library may be organized as a list displaying each of the available animation options (e.g., a first animation option, such as a smile, a second animation option, such as saying a greeting, a third animation option, such as laughing and waving, etc.), a list of animated figure features associated with the options (e.g., mouth 86 position changes, eyes 82 position changes, arms 88 position changes, etc.), a network displaying the animation options, or any other suitable manner of displaying the animation options and/or facilitating review and/or selection of the animation options. A greater number of animation options associated with multiple sensed inputs may enhance the overall effectiveness of guest interaction with the animated FIG. 12.

The method 100 receives a combination of sensor inputs (block 104) used to select an animation. The inputs may be sensed data from one or more cameras 32, as discussed above. Thus, the input may include data for body outlines or images of detected guests using facial or body recognition as determined by the animation controller 30 and using data captured by the camera 32. The inputs may also include shiny object detection, which may in turn include data from shiny object detectors 26 (e.g., reflectivity sensors and/or metal detectors), as well as shape recognition using camera data captured from the camera 32, and specifically detecting shiny objects on the body. Furthermore, the sensed input may also include data detected by shiny object detectors 26, additional sensors 28, and/or RFID tags 38. The shiny object detectors 26 may be used to detect shiny objects near the animated FIG. 12. Thus, the combination of body or face recognition and shiny object detection may be used for sensor input to precisely detect guests and/or location of shiny objects on the guest.

Next, an animation based on the received sensor input (block 106) may be selected. The animation may be sent as an animation signal (e.g., control signal(s)) to be processed by a figure processer 60 of the animated FIG. 12.

Once the animated FIG. 12 receives and processes the selected animation from the animation controller 30, the animation is executed by the animated FIG. 12. Executing the animation on the physical structure of the animated FIG. 12 may include actuating the animation in the various actuators 58 of the animated FIG. 12 (process block 108). For example, actuating may cause the animated FIG. 12 to modify the positioning of its physical features to a frown, a smile, project sounds, follow metal object with eyes, and the like by providing the control signals to the actuators 58. Thus, actuations may cause guests to perceive the animated FIG. 12 as acting in a manner that is responsive or unique to the guest and/or particular shiny object detected.

While only certain features of the present disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An animation system, comprising:
   an animated figure;
   at least one sensor; and
   an animation controller comprising a processor and a memory, wherein the memory stores instructions executable by the processor, the instructions configured to cause the animation controller to:
   receive shiny object detection data from the at least one sensor;
   track a guest associated with the shiny object detection data;
   determine an animation sequence for the animated figure based on the shiny object detection data;
   transmit a control signal indicative of the animation sequence to cause the animated figure to execute the animation sequence for a predetermined time period; and
   in response to completion of the predetermined time period, track next-strongest shiny object detection data, a next-closest guest, or both.

2. The animation system of claim 1, wherein the instructions are configured to cause the animation controller to:

in response to tracking the next-strongest shiny object detection data, determine a second animation sequence based on the next-strongest shiny object detection data;

determine that the next-strongest shiny object detection data corresponds to a second shiny object different than a first shiny object associated with the shiny object detection data; and transmit a second control signal indicative of the second animation sequence to cause the animated figure to execute the second animation sequence, the second animation sequence being different than the animation sequence.

3. The animation system of claim 1, wherein the instructions are configured to cause the animation controller to:

in response to tracking the next-strongest shiny object detection data, determine a second animation sequence based on the next-strongest shiny object detection data;

determine that the next-strongest shiny object detection data corresponds to a shiny object associated with the shiny object detection data; and transmit a second control signal indicative of the second animation sequence to cause the animated figure to execute the second animation sequence, the second animation sequence being the same as the animation sequence.

4. The animation system of claim 1, wherein the animation sequence comprises one or more particular animations of a plurality of animations, the one or more particular animations correlating to a shiny object of a plurality of shiny objects.

5. The animation system of claim 1, wherein the instructions are configured to cause the animation controller to:

disregard the next-strongest shiny object detection data, the next-closest guest, or both, during the predetermined time period for executing the animation sequence.

6. The animation system of claim 1, comprising:

detect the guest using skeletal tracking, facial recognition, body recognition, or any combination thereof.

7. The animation system of claim 1, wherein the instructions are configured to cause the animation controller to:

track the shiny object detection data or the next-strongest shiny object detection data among a plurality of shiny object detection data based on the shiny object detection data or the next-strongest shiny object detection data being associated with a relatively highest level of metal detection or reflectivity.

8. The animation system of claim 1, wherein the shiny object detection data corresponds to a first shiny object on the guest and the next-strongest shiny object detection data corresponds to a second shiny object on the guest.

9. The animation system of claim 1, wherein the instructions are configured to cause the animation controller to:

identify a shiny object of a plurality of shiny objects based on the shiny object detection data, wherein identifying the shiny object is based at least in part on a metal detection classification, shape recognition, or both.

10. The animation system of claim 1, wherein the guest and the next-closest guest are tracked within a predetermined distance from the animated figure.

11. The animation system of claim 1, wherein the instructions are configured to cause the animation controller to:

track the next-strongest shiny object detection data, the next-closest guest, or both;

in response to the next-strongest shiny object detection data, the next-closest guest, or both, being outside a predetermined distance from the animated figure, stop tracking the next-strongest shiny object data, the next-closest guest, or both; and track another next-strongest shiny object detection data, another next-closest guest, or both, within the predetermined distance.

12. A method, comprising:

receiving shiny object detection data from one or more sensors configured to detect metal objects or shiny objects;

tracking a guest associated with the shiny object detection data;

determining an animation sequence for an animated figure based on the shiny object detection data;

sending a control signal to cause the animated figure to activate one or more actuators of the animated figure to execute an animation of the animation sequence for a predetermined time period; and in response to completion of the predetermined time period, tracking next-strongest shiny object detection data, a next-closest guest, or both.

13. The method of claim 12, wherein the animation sequence comprises a reaction of a plurality of reactions, the reaction corresponding to a particular shiny object type of a plurality of shiny object types.

14. The method of claim 12, comprising:

in response to tracking to the next-strongest shiny object detection data, determining a second animation sequence based on the next-strongest shiny object detection data; and in response to the next-strongest shiny object detection data corresponding to a shiny object different than the shiny object associated with the shiny object detection data, transmitting a second control signal indicative of the second animation sequence to cause the animated figure to execute the second animation sequence, the second animation sequence being different than the animation sequence.

15. The method of claim 12, comprising:

in response to tracking to the next-strongest shiny object data, determining a second animation sequence based on the next-strongest shiny object detection data; and in response to the next-strongest shiny object detection data corresponding to a shiny object same as the shiny object associated with the shiny object detection data, transmitting a second control signal indicative of the second animation sequence to cause the animated figure to execute the second animation sequence, the second animation sequence being the same as the animation sequence.

16. The method of claim 12, wherein the animation sequence comprises one or more particular animations of a plurality of animations, the one or more particular animations being indicative of a shiny object of a plurality of shiny objects.

17. The method of claim 12, comprising:

disregarding the next-strongest shiny object detection data, the next-closest guest, or both, during the predetermined time period for executing the animation sequence.

18. An animation system, comprising:

an animated figure comprising one or more actuators configured to actuate at least a portion of the animated figure;

at least one sensor; and an animation controller comprising a processor and a memory, wherein the memory stores instructions executable by the processor, the instructions configured to cause the animation controller to:

receive shiny object detection data of a shiny object from the at least one sensor;

determine an animation sequence based on the shiny object detection data;

transmit a control signal indicative of the animation sequence to cause the animated figure to execute the animation sequence for a predetermined time period by actuating the one or more actuators; and in response to completion of the predetermined time period, identifying a different shiny object based on a next-strongest shiny object detection data, a next-closest guest, or both.

19. The animation system of claim 18, wherein the one or more actuators comprise an electromechanical actuator.

20. The animation system of claim 18, wherein the one or more actuators comprise a linear actuator.

* * * * *